(12) United States Patent
Hansmann et al.

(10) Patent No.: US 7,133,843 B2
(45) Date of Patent: Nov. 7, 2006

(54) EASY CHECK-OUT WITH ENHANCED SECURITY

(75) Inventors: Uwe Hansmann, Altdorf (DE); Lothar Merk, Weil i.Sch. (DE); Thomas Stober, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1337 days.

(21) Appl. No.: 09/745,818

(22) Filed: Dec. 21, 2000

(65) Prior Publication Data

US 2001/0024157 A1    Sep. 27, 2001

(30) Foreign Application Priority Data

Dec. 30, 1999    (EP) .................................. 99126197

(51) Int. Cl.
*G06Q 40/00* (2006.01)
(52) U.S. Cl. ............................. 705/41; 705/35; 705/39; 705/40
(58) Field of Classification Search .................. 705/35, 705/16, 17, 20, 22, 24, 41, 40, 39
See application file for complete search history.

(56) References Cited

U.S. PATENT DOCUMENTS 5,637,846 A * 6/1997 Boers et al. ................. 235/383

FOREIGN PATENT DOCUMENTS

WO    WO9966456    * 12/1999

* cited by examiner

*Primary Examiner*—Lalita Hamilton
(74) *Attorney, Agent, or Firm*—William A. Kinnaman, Esq.; Kevin P. Radigan, Esq.; Heslin Rothenberg Farley & Mesiti, P.C.

(57) ABSTRACT

This invention is a contactless label chipcard including payment and identification information and a check-out system including a contactless reader for reading and updating payment information stored in that label chipcard. The contactless label chipcard is attached to a product, and the system further includes a device for reading and initiating updating of the payment status resident on the chipcard. The device includes the contactless reader for reading information stored in the contactless label chipcard, and a component for generating an invoice based on the information received from the contactless label chipcard. Further, the device includes a component for checking payment of the invoice and a component for initiating update of the payment status. Corresponding methods and computer program products are also provided.

24 Claims, 4 Drawing Sheets

EASY CHECK-OUT WITH ENHANCED SECURITY

PRIOR FOREIGN APPLICATION

This application claims priority from European patent application number 99126197.5, filed Dec. 30, 1999, which is hereby incorporated herein by reference in its entirety.

TECHNICAL FIELD

This invention relates to a check-out system for supermarkets or department stores for accomplishing an easy check-out with enhanced security.

This invention relates in particular to a contactless label chipcard including payment and identification information and a check-out system including a contactless reader for reading and updating payment status information stored in that label chipcard.

BACKGROUND ART

In supermarkets or department stores consumers normally put articles selected to buy into a shopping cart, move the cart to a check-out station at which the articles have to be paid and put them onto a belt. The cashier scans each article separately by the use of a bar code reader and puts the article back on the belt. Then, the customer puts back the articles into his cart or into a bag.

In more advanced supermarkets customers are entitled to scan the barcode of the articles by themselves by a device embedded in the cart or by a hand held device. At the check-out station the cashier or the customer transfers the data from the device into the POS system and the invoice or bill is issued by the check-out system. Preventing frauds customers will be selected accidentally and controlled. This system is based on trusting in the customer. A disadvantage of that system is that frauds cannot not be excluded totally.

Prior art systems which deal with contacts labels attached to articles or products mainly discusses anti theft systems. The operation of those antitheft systems with the single use label is based on two principles. One system utilizes an electromagnetic radio frequency (RF) field of a defined frequency and works with labels or tags which contains a tuned circuit consisting of a coil and capacitor. The other systems utilizes an electromagnetic RF field of a defined frequency and works with labels containing a strip of amorphous metal having specific properties.

Few examples of those systems are disclosed in the following US patents:

U.S. Pat. No. 5,608,380 discloses a deactivation and coding system for contactless anti theft or identification label. This system uses a pyrotechnic material to burn away a track portion, whereby an electrical connection is severed. The labels in the system consist of tuned circuits in the form of one or more coil/capacitor combinations. Deactivation can be effected by severing the connection between coil and the associated capacitor.

U.S. Pat. No. 5,103,210 discloses an activatable/deactivatable security tag for use with a electronic system for a controlled area. The tag comprises circuitry for initially establishing a resonant circuit having a first resonating frequency within a first frequency range which is outside the range of the detection frequency of the electronic security system. The tag is activated by changing the resonating frequency of the resonant circuit to a second frequency within the detection frequency range by exposing the resonant circuit to electromagnetic energy with the first frequency range at the predetermined minimum power level to short-circuit a first circuit component. The tag is deactivated by again changing the resonant frequency of the resonant circuit to a third resonant frequency within a third frequency range which is also outside of the detection frequency range exposing the resonant circuit to electromagnetic energy within the detection frequency range of at least a predetermined minimum power level to short-circuit a second component.

U.S. Pat. No. 5,081,445 discloses an electronic article surveillance (EAS) tags which are attached to articles of merchandise not at the stores using EAS equipment, but in conjunction with the manufacture of these articles. At that stage, the tags are detectable by the EAS equipment. They are made detectable upon receipt by an EAS using store. For swept frequency RF EAS equipment, the tags are initially provided with two capacitors which make the tags resonant at a first frequency not detectable by the store's equipment. To activate them, one capacitor is disabled, thereby making the tags resonant at a different frequency which is detectable.

A further use of label chipcards is disclosed in the press announcement of Philips (http://www-us.semiconductors.com/news/content/file_381.html) as follows:

The world's first large-scale trial to identify airline luggage, using disposable "smart labels" to speed up luggage handling, reduce missing baggage and increase security, began this month. For the two month trial, British Airways has asked Philips Semiconductors to test its I•CODE smart label radio frequency identification (RFID) technology to identify 75,000 suitcases travelling with passengers from Munich, Germany and Manchester, UK to London's Heathrow airport.

Each "smart bag tag" contains an integrated circuit (IC), that can be programmed with detailed information such as the date and time the luggage is checked in, the weight, as well as a unique identification number and the passenger's destination.

The I•CODE IC is so thin and small it can be placed between two layers of paper, inside the baggage tag currently used by airlines. The IC is attached to an antenna, which also lies inside the label, and communicates with the scanner by radio signals, from a distance of up to 1.2 meters away. No battery is required inside the label as the I•CODE chip is powered by the radio signal from the scanner.

With the present bar coded luggage tags, nearly half of baggage in transfer requires manual handling to route it to the correct aircraft. Smart labels have many advantages over bar coded alternatives as they use radio frequency to communicate and therefore do not require a direct "line of sight". They can also be scanned from over one meter away. The technology allows several smart labels to be scanned simultaneously, speeding up the baggage handling process. In addition, the information on smart labels can be re-programmed, or added to, without the need to print and attach a new label. This means, for example, that new travel details can be easily added.

British Airways is carrying out the field test on a noncompetitive basis, inviting other major airlines to visit the installation. The results will be presented to IATA, the International Air Transport Association.

All above mentioned anti theft systems have the disadvantage that the labels are exclusively used as a security labels for detecting not paid articles. The labels itself does not simplify the payment. Furthermore, the security labels having no sufficient protection against manipulation.

SUMMARY OF THE INVENTION

It therefore object of the present invention to teach a method and system for simplifying the above mentioned systems and simultaneously improving their security.

This object is reached by the features of the independent claims. Further advantageous embodiments of the present invention are laid down in the subclaims.

According to this invention all articles offered in the store are labeled with a contactless label chipcard. In the memory of the label chipcard at least the label and product identification information (number) and payment status information (paid or unpaid) are stored. In a further embodiment of the present invention the chipcard stores additionally product price information as well an authentication key. For carry out that invention the check-out system requires an additional computer program which executes the communication between the label chipcard and the check-out system inclusively the payment.

Passing the check-out system with the cart in which articles with attached label chipcards are placed a communication between contactless label chipcard and checkout system will be established. Preferably the communication is established over a radio field generated by a generator of the check-out system. Based on the information received from the label chipcard, the check-out system generates the invoice or bill and the payment status information for each article will be updated into PAID. Articles having the payment status not paid will be detected by a warning system which is part of the check-out system.

The check-out system is positioned at such a point in the store that all articles can remain in the cart without putting them onto a belt. This simplifies essentially the buying in a store.

BRIEF DESCRIPTION OF THE DRAWINGS

The present invention is described using a preferred embodiment with figures, where.

BEST MODE FOR CARRYING OUT THE INVENTION

Figure 1:
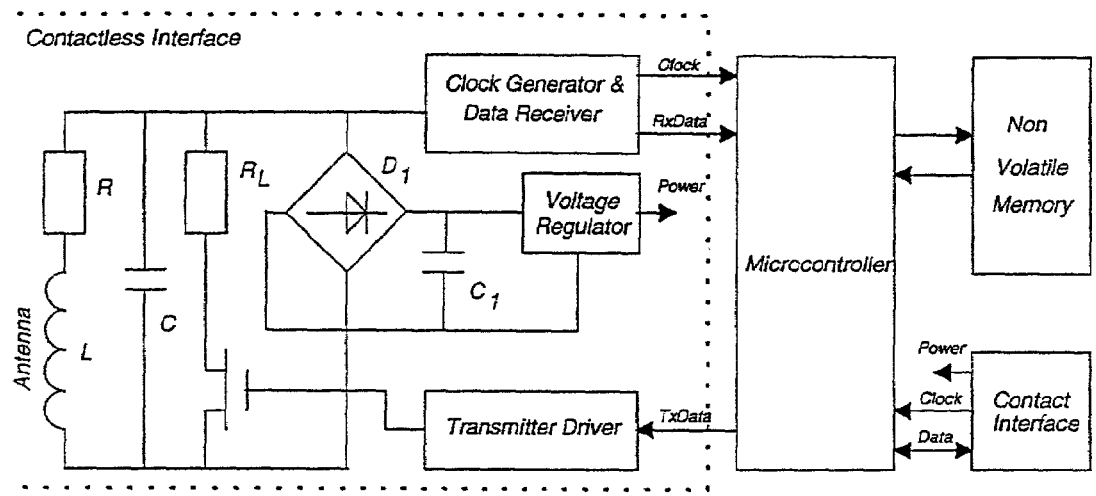
FIG. 1 shows a standard chipcard which may be used in the present invention.

FIG. 1 shows a block diagram of a contactless chipcard. The chipcard includes a contactless interface, antenna, resistors, diode, clock generator & data receiver, voltage, regulator, transmitter driver, microcontroller and nonvolatile memory. Such contactless chipcards are not thicker than . . . available on the market.

Figure 2:
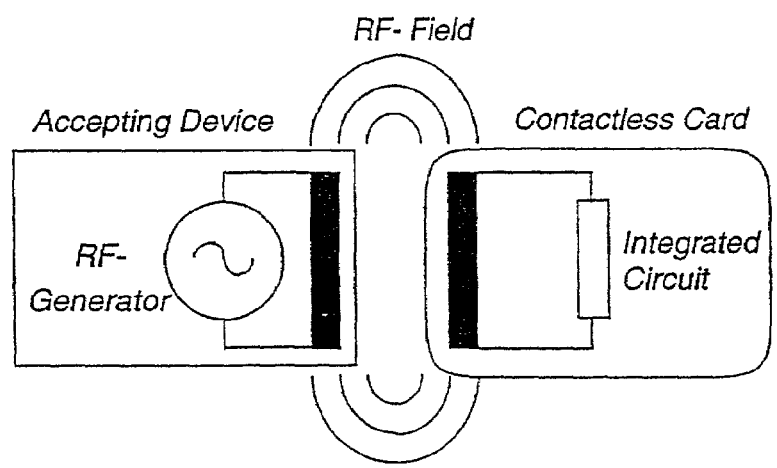
FIG. 2 shows a standard device for contactless communication between an accepting device (e.g. check-out system) and a contactless chipcard (e.g. label chipcard).

FIG. 2 shows energy and clock transmission between accepting device which could be a part of a check-out system and a contactless chipcard which could be used as a label chipcard.

To transfer data from the acceptance device to the contactless chipcard two methods are actually used: the capacitive and the inductive coupling.

With the capacitive coupling small metal plates must be integrated in the acceptance device and the card. The plates provide a capacity of some 10 pF. This capacity is high enough for data transmission but to small for energy transmission.

For data transmission two metal plates are used to allow a differential voltage method.

Each plate is charged in the opposite polarity. An inverting of the voltage is interpreted as a change of the logic state of the serial data stream.

If the distance between the chipcard and the device is increased, the capacity decreases and the data transmission can be interrupted. Therefore the capacity coupling is only possible for an operating range of some mm, in addition, the card must be in a relative exact position within the accepting device.

Allowing transmission over a larger distance the inductive coupling is used. Within this method an already existing RF-frequency, that is used for energy transmission, is used also for data transmission. Data transmission is accomplished by modulating the carrier signal by amplitude, frequency or phase. The close coupling cards use the phase shift key method and the remote fix coupling cards use the amplitude shift key method.

To transfer the data from the chipcard to the accepting device also two methods are actually used: the capacitive coupling and the inductive coupling. The capacitive coupling is equivalent as used to transfer the data from the acceptance device to the card.

To allow a data transmission over a large distance the inductive coupling is used. The mainly method is load modulation with use of a sub carrier frequency. The sub carrier frequency is generated by dividing the carrier frequency of the accepting device on the card. A load modulation is performed by switching a load resistor in parallel to the coil (antenna). In the state "load on" resistor is intermediate switched on and off with the sub carrier frequency. The acceptance device measures the load changes and converts this changes to a serial data stream. The bit coding of the serial data stream is system dependent implemented.

Figure 3:
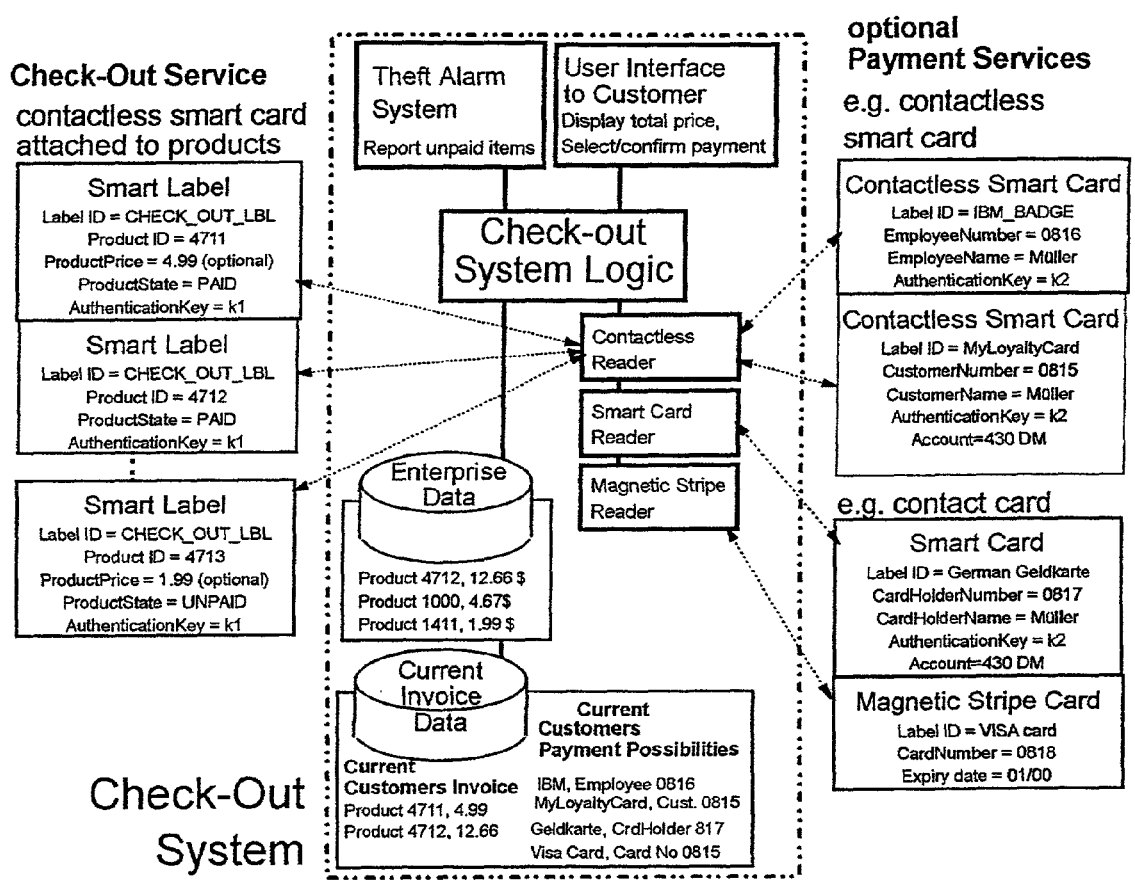
FIG. 3 shows basic architecture of the present invention with optional payment services.

FIG. 3 shows the basic architecture of the present invention with optional payment services.

A significant component of the present invention is the inventive check-out system which preferably includes a contactless reader for reading information received from the contactless label chipcard which is attached to each article. A further embodiment of the check-out system includes a contactless reader as well as a reader for contact payment chipcards. The contact payment chipcard could be an electronic purse or a credit card.

Another further embodiment of the check-out system includes additionally a reader for reading magnetic stripe cards. The check-out system accesses product data for calculating invoice or bill identified by the information received from the label chipcard. These product data or enterprise data are preferably available via an enterprise server having an enterprise data base.

A further embodiment of the present invention suggests the implementation of a system for determining payment possibilities for a customer based on the information received from chipcard, e.g. VISA card, My Loyalty Card, electronic purse which are inserted in a contact reader of the check-out system. In the case a contactless customer payment chipcard is offered by the store the customer chipcard preferably contains the label ID (e.g. label ID=My LoyaltyCard), customer identification number (e.g. 0815), customer name (e.g. Müller), authentication key (e.g. k2) and credit limit(e.g. 400 DM).

In the case a contactless employee chipcard is used such a chipcard preferably contains the label ID (e.g IBM BADGE), employee identification number (e.g. 0816), employee name (e.g. Müller) and the authentication key (e.g. k2).

Finally a contact chipcard like a magnetic stripe card preferably contains the label ID (e.g. VISA card), card number (0818) and expiry date (e.g. 01/100).

A contactless label chipcard usually communicates with the reader of the check-out system via radio frequencies using a specific protocol. In a contactless environment, several contactless chipcards can be present at the same time in an activation field. To communicate with a specific chipcard, the IFD subsystem uses an anticorrosion procedure. Each chipcard is identified and addressed using a specific ID.

The inventive check-out system preferably includes an interface device with the following components: a display, an input-device, e.g. keyboard, an output-device, e.g. a printer.

Finally, the check-out system includes an anti theft alarm system for detecting articles which are not paid.

The label chipcard which is attached on each article contains preferably following information:
label ID
product or article ID
product or article status paid/unpaid
authentication key.

Optionally the label chipcard further contains price information.

These information are stored in a record in the nonvolatile memory of the label chipcard.

The communication between label chipcard and check-out system may be accomplished by a method as laid down in FIG. 2. The contact label chipcard has the functionality of a normal chipcard however a label chipcard in a special thin embodiment is used.

Figure 4:
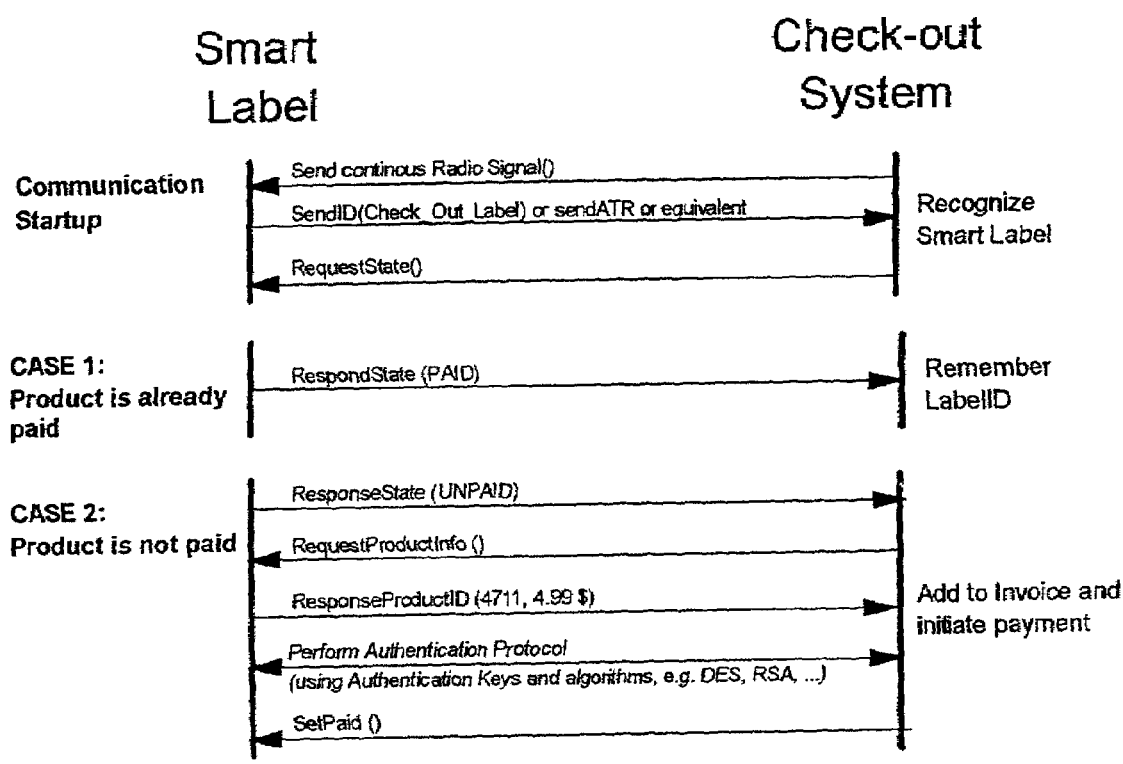
FIG. 4 shows a preferred embodiment of the communication protocol between label chipcard and check-out system.

FIG. 4 shows a preferred embodiment of the communication protocol between label chipcard and check-out system. Check-out system sends out radio signals permanently. When a contactless label chipcard is coming in the range of the radio field an ATR will be automatically generated and sent via the antenna to the contactless reader of the check-out system. The contactless reader receives the ATR and in the case the ATR is recognized a RequestState will be sent to the label chipcards.

When the article is already paid the label chipcard sends a ResponseState=PAID to the contactless reader of the check-out system. The label ID will be ignored and not considered in generating an invoice.

When the article is not paid the label chipcard sends a ResponseState=UNPAID to the contactless reader of the check-out system. The check-out system automatically returns a RequestProductInfo to the label chipcard. The label chipcard sends a ResponseProductID to the contactless reader and the Product ID will be stored for generating an invoice. An authentication protocol for authenticating the check-out system is executed when the Request SetPaid is initiated. The authentication protocol may be executed by symmetric or asymmetric algorithm (e.g. DES, RSA). When the check-out system is authenticated, e.g. the label chipcard has generated a digital signature which is identical with the digital signature added to the Request SetPaid, then the article status can be updated by a RequestSetPaid.

The article status is laid down in a record of a file in non volatile memory of the label chipcard.

For example the article status=UNPAID is defined by a specific bit sample. By the "RequestSetPaid" that bit sample will be overwritten by a new bit sample with the status=PAID. Normally the article status is initialized by the manufacturer or packaging company. The communication between label chipcard and contactless reader is preferably performed by means of APDU's.

Figure 5:
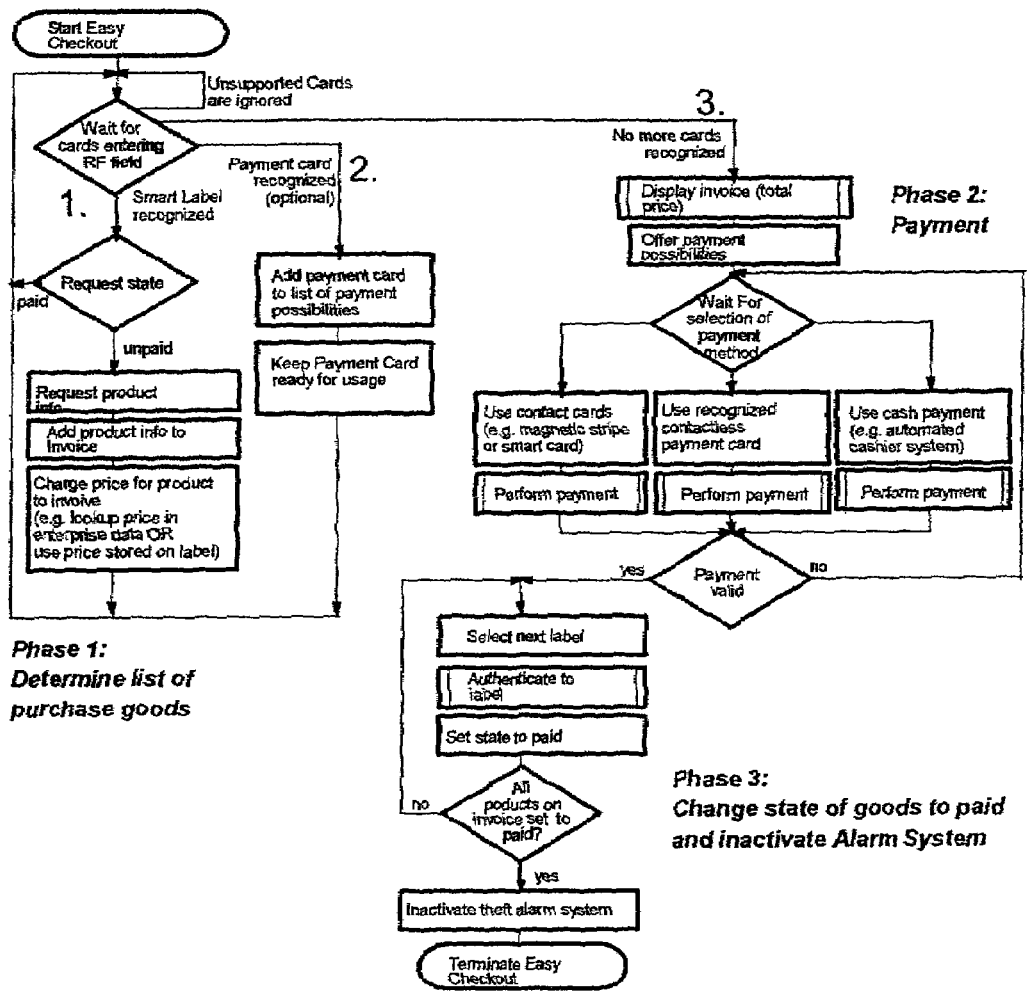
FIG. 5 shows a preferred method for contactless payment according to the present invention.

FIG. 5 shows a preferred method for contactless payment according to the present invention.

The inventive method starts with the step of examination of the presence of a contactless chipcard in the RF field. Not identified chipcards will be ignored. For recognized chipcards the method will determine the article status PAID or UNPAID. If the article status is UNPAID, the following steps will be performed by the inventive method:

1. The check-out system sends a request to the selected label chipcard for providing product information
2. The product information is stored in memory of check-out system
3. Step 1 and 2 will be repeated for all identifiable label chipcards
4. If all label chipcards recognized, generating an invoice (e.g. look up price in enterprise data or use price stored in the label chipcard) based on information received from said label chipcards.
5. Preferably the check-out system is displaying the generated invoice at the display and is offering different payment possibilities as options. Preferably the check-out system offers a graphical user interface for selecting payment possibilities.
6. The inventive method examines the validity of the selected and performed payment.
7. If the payment has been successful e.g. the payment was valid the method selects a label chipcard identified in generated invoice.
8. An authentication protocol for the selected label chipcard is executed. The authentication may be executed by a symmetric or asymmetric algorithm. In a preferred embodiment the check-out system generates with support of the key A which is identical with key B of the label chipchard and "RequestSetPaid" a MAC or digital signature.
9. The check-out systems sends a "RequestSetPaid" with a MAC or digital signature to the selected label chipcard.
10. The label chipcard will overwrite the record with the updated payment status information only if the MAC or digital signature provided with that request is identical with the MAC or digital signature generated by the label chipcard with support of key B.
11. Steps 8–11 will be repeated for all articles or products identified by the invoice.
12. When all steps are completed or fulfilled the theft alarm system or system for preventing theft will be deactivated.

Avoiding that unpaid articles can leave the supermarket or department store without warning signal the "RequestSetPaid" can only be performed when the validity of payment is confirmed. For example, a cashier confirms the payment by pressing a confirmation button. However the confirmation of payment can be made in every other possible way.

Another embodiment of the inventive method deals with the possibility that the customer can select between different payment methods, e.g. noncash payments by means of credit card or electronic purse.

Before the RequestSetPaid can be performed a confirmation step that the noncash payment has been valid must be implemented.

The payment can be performed by means of contact cards like magnetic stripe cards or chipcards, contactless payment card, e.g. issued by the store, or cash payment, e.g. automated cashier system.

This invention relates to a contactless label chipcard including payment and identification information and a check-out system including a contactless reader for reading and updating payment information stored in that label chipcard. According to this invention all articles offered in a store are labeled with a contactless label chipcard. In the memory of the label chipcard at least product identification information (number) and payment status information (paid or no paid) are stored. In a further embodiment of the present invention the chipcard stores additionally product price information as well an authentication key. For carry out that invention the check-out system requires an additional computer program which executes the communication between the label chipcard and the check-out system inclusively the payment. Passing the check-out system with the cart in which articles with attached label chipcards are placed, a communication between contactless label chipcard and checkout system will be established. Preferably the communication is established over a radio field generated by a generator of the check-out system. Based on the information received from the label chipcard, the check-out system generates the invoice or bill and the payment status information for each article will be updated into PAID. Articles having the payment status not paid will be detected by a warning system which is part of the check-out system.

This invention allows buying articles without recording them manually by the cashier. This is more convenient for the customer as well the cashier. Furthermore, the customer does not have to unpack his cart and put all articles from the cart onto belt and back in his cart after the articles are scanned. Due to faster processing, less cashier systems and less personnel are necessary. In the case the customer scans the articles himself, the invention will be used to check the accuracy of the list scanned by the customer.

There are several advantages of the present invention compared with prior art systems. This invention allows buying articles without recording them manually by the cashier. This is more convenient for the customer as well the cashier. Furthermore, the customer does not have to unpack his cart and put all articles from the cart onto belt and back in his cart after the articles are scanned. Due to the faster processing, less cashier systems and less personnel are necessary. In the case the customer scans the articles himself, the invention will be used to check the accuracy of the list scanned by the customer.

What is claimed is:

1. System comprising:
   a contactless label chipcard attached to a product containing at least information identifying said product and payment status thereof, and a component for execution of an update of the payment status of said product
   a device for reading and initiating update of the payment status comprising at least:
      a contactless reader for reading information stored in said contactless label chipcard
      a component for generating an invoice based on said information received from said contactless label chipcard
      a component for checking payment of said invoice
      a component for initiating update of the payment status in the contactless label chipcard.

2. System according to claim 1, wherein said label chipcard contains following information:
   Label ID
   Product ID
   Payment status PAID or NOT PAID
   AuthenticationKey.

3. System according to claim 2, wherein said label chipcard additionally contains product price information.

4. System according to claim 2, wherein said information are stored in the non-volatile memory of said label chipcard.

5. System according to claim 1, wherein said contactless reader comprising at least a component for sending to and receiving information from said label chipcard.

6. System according to claim 5, wherein said contactless reader uses inductive coupling for data transmission.

7. System according to claim 1, wherein said contactless label chipcard comprises at least a component for sending to and receiving information from said contactless reader.

8. System according to claim 7, wherein said contactless reader comprises at least a component for sending to and receiving information from said label chipcard, said contactless reader further comprising a generator for generating a RF-field whereby said contactless reader and said contactless label chipcard uses said RF-field for data transmission.

9. System according to claim 1, wherein said component for generating an invoice has access to enterprise data not contained in said label chipcard for generating an invoice.

10. System according to claim 1, wherein said device for reading and initiating the update of the payment status further comprises:
    a data processing device with non-volatile memory for storing said component for checking the payment of said invoice and said component for initiating the update of the payment status in said contactless label chipcard
    a data connection between said data processing device and said reader
    a display device for displaying invoice information
    a warning device for detecting not paid products.

11. System according to claim 10 further comprises:
    a contact card reader as payment means
    a contactless card reader as payment means.

12. System according to claim 10, wherein said device for reading and initiating the update of the payment status is part of a check-out system.

13. Contactless product label chipcard for use in a system according to claim 1 comprising at least:
    a component for sending to and receiving information from a contactless reader
    a non-volatile memory containing at least following information:
      Label ID
      Product ID
      Payment status PAID or NOT PAID
      AuthenticationKey
    a component for execution of the update of the payment status by means of authentication.

14. A device for reading and initiating payment status for use in a system according to 1 comprising at least:
    a contactless reader for reading information stored in said contactless label chipcard a component for generating an invoice based on said information received from said contactless label chipcard a component for initiating update of the payment status on said label chipcard a data processing device for storing said component for checking the payment of said invoice and said component for initiating update of the payment status in said contactless label chipcard a data connection between said data processing device and said reader a display device for displaying invoice information a warning device for detecting not paid products.

15. Method for executing payments in a system as claimed in claim 1 comprising the steps of:

Detecting presence of a contactless label chipcard in the range of the contactless reader Requesting product information from said detected label chipcard Storing product information in a memory of said device Repeating aforementioned steps for all label chipcards detected in the range of said contactless reader Generating invoice based on said information stored in said memory Execution of payment and examination of validity of said payment Sending "RequestSetPaid" with authentication protocol information by said component for initiating update of the payment status via said contactless reader to a selected label chipcard if the payment was valid Execution of said "RequestSetPaid" on said selected label chipcard by said component for execution the update of the payment status when the authentication protocol information provided with said "RequestSetPaid" is identical with the authentication protocol information generated by said label chipcard Repeating execution step for all articles or products covered by the invoice Inactivating said warning system.

16. Computer program product stored in the internal memory of a computer containing parts of software code for performance of the method according to claim 15.

17. Method according to claim 15 wherein said product information contains a product identification ID and/or a product price information.

18. Method according to claim 16 wherein said product price information can be changed by an authorized device.

19. Computer program product stored in the internal memory of a computer containing parts of software code for performance of the method according to claim 18.

20. Method according to claim 15 wherein said invoice is generated with further product data identified by means of said information provided by said label chipcard.

21. Method according to claim 15 wherein the execution of payment is supported by an user interface with different option of payment.

22. Method according to claim 15 wherein the step of detecting presence of the label chipcard comprises the further steps:

detecting presence of a contactless payment chipcard in the range of the contactless reader offering use of the detected contactless payment chipcard for performing the payment.

23. Computer program product stored in the internal memory of a computer containing parts of software code for performance of the method according to claim 22.

24. Method according to claim 15 wherein said authentication protocol information is a digital signature or a MAC.

* * * * *